April 10, 1956  R. A. LADSON  2,741,002
WEATHERSTRIP
Filed Oct. 22, 1953

Russell A. Ladson
INVENTOR.

BY *Clarence A. O'Brien*
*and Harvey B. Jacobson*
Attorneys

United States Patent Office 2,741,002
Patented Apr. 10, 1956

2,741,002
WEATHERSTRIP

Russell A. Ladson, Grosse Pointe, Mich.

Application October 22, 1953, Serial No. 387,654

4 Claims. (Cl. 20—66)

The present invention relates to new and useful improvements in weatherstrip construction for doors or similar swingably mounted objects.

An important object of the invention is to provide a weatherstrip for the bottom of the door to effectively seal the same.

Another object is to provide a two-part weatherstrip construction composed of a fixed moulding strip attached to a door sill and a resilient T-shaped weatherstrip attached at one end of its cross head to the lower portion of a door and with the moulding strip in the path of the lower edge of the weatherstrip during closing movement of the door to flex the weatherstrip in a straddling position over the moulding strip to thus provide a double sealing contact with the latter.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
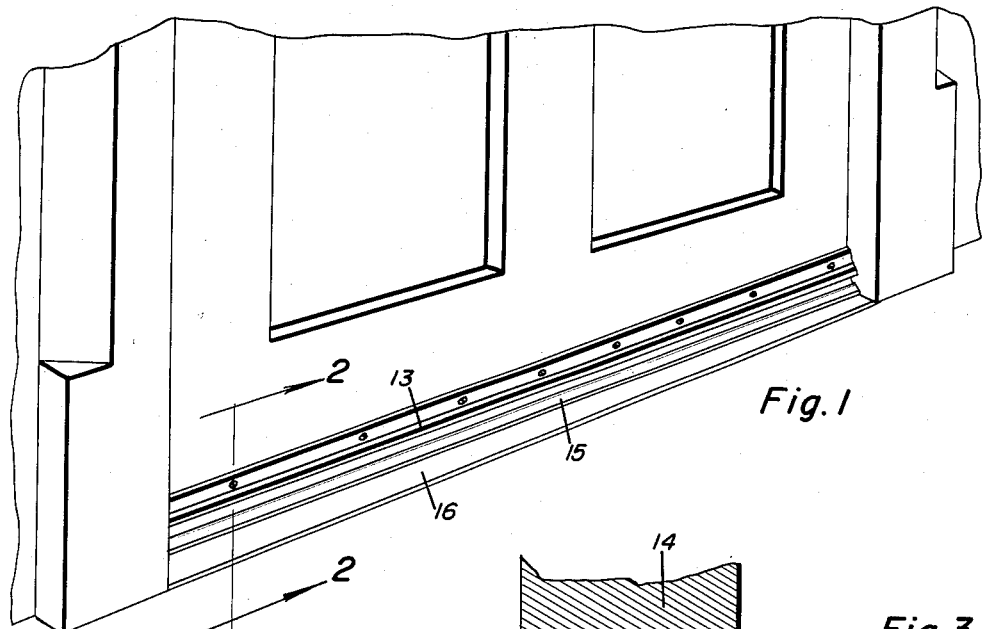
Figure 1 is a perspective view.
Figure 3:
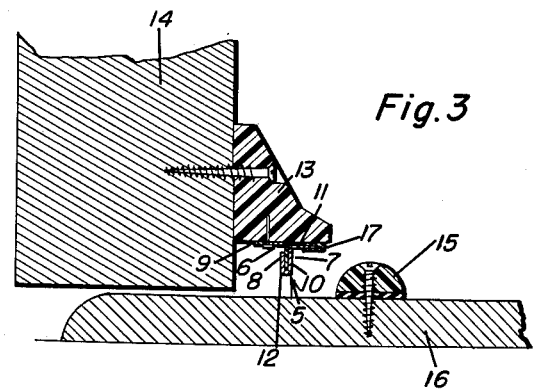
Figure 3 is a similar sectional view showing the door in partly open position.
Figure 2:
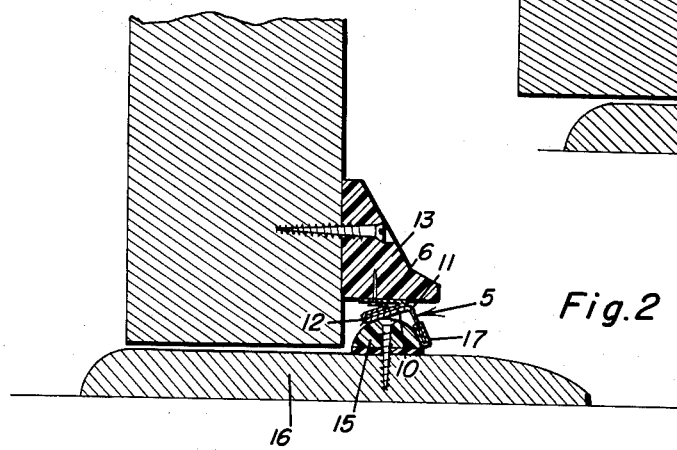
Figure 2 is an enlarged fragmentary vertical sectional view taken on a line 2—2 of Figure 1.
Figure 4:
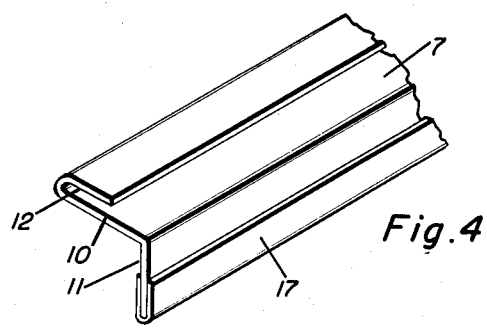
Figure 4 is a fragmentary enlarged perspective view of the rigid angle strip forming part of the T-shaped weatherstrip.

Referring now to the drawing in detail, wherein for the purpose of illustration I have disclosed a preferred embodiment of my invention, the numeral 5 designates a weatherstrip of substantially T-shape in cross-section and composed of a pair of strips 6 and 7 of angle construction.

Strip 6 is constructed of resilient metal, rubber or other suitable material and includes flanges 8 and 9 and strip 7 is constructed of rigid material and includes flanges 10 and 11. Flange 10 of strip 7 is formed with a channel 12 in which the flange 8 of strip 6 is secured by compressing or closing the channel tightly against flange 8 to retain the flanges 8 and 10 in confronting relation to each other to form the leg portion of the T-shaped weatherstrip, while the flanges 9 and 11 project outwardly from the leg portion in opposite directions to form the cross-head of the T-shaped weatherstrip.

The flange 9 of the weatherstrip is nailed or otherwise suitably secured to the underside of a moulding strip 13 which is attached to the inner surface of a door 14 in a horizontal position adjacent the lower edge of the door and with the flange 11 free and also positioned against the underside of the moulding strip and with the leg portion of the weatherstrip also free and extending downwardly under the moulding strip and in front of the door.

A weather moulding strip 15 is preferably constructed of rubber and of half-round or semi-cylindrical shape in cross-section and is secured on top of a door sill 16 in the path of the vertical flanges 8 and 10 which form the leg portion of the weatherstrip 5 upon the closing of the door, whereupon the strip 6 will flex to swing the strip 7 downwardly in a straddling position on top of the rubber moulding strip 15.

A rubber sealing strip 17 of channel construction encloses the free edge of flange 11 to provide an effective weather seal with the strip 15, while the resiliency of strip 6 will firmly hold the leg portion of the T-shaped weatherstrip against the strip 15 to provide a double sealing engagement therewith.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A weatherstrip for horizontally swingable closures comprising in combination, a resilient strip of T-shape in cross-section and attached at one upper longitudinal edge portion to the lower portion of the closure with its head portion in a horizontal plane, while the other upper longitudinal edge portion remains free and with the vertical portion of the strip extended downwardly, and an elongated member secured in a fixed position substantially in the horizontal plane of the lower edge of the closure and in the path of the vertical portion of the strip to flex the latter and swing the free upper longitudinal edge portion of the strip downwardly against the fixed member upon contact of the strip therewith.

2. A weatherstrip for horizontally swingable closures comprising in combination, a resilient strip of T-shape in cross-section having its head portion in a horizontal plane and composed of a pair of angle strips, each including a vertical flange and a horizontal flange, said vertical flanges being secured in confronting relation to each other to form the vertical portion of the T-shape strip, at least one of said angle strips being resilient and secured at its horizontal flange to the closure adjacent the lower portion of the latter, while the horizontal flange of the other of said angle strips remains free, and a fixed elongated member in the path of the vertical flanges during closing movement of the closure to flex the united strips and swing the said other angle strip downwardly in straddling sealing position on the fixed member.

3. A weatherstrip for horizontally swingable closures comprising in combination, a resilient strip of T-shape in cross-section having its head portion in a horizontal plane and composed of a pair of angle strips, at least one of which is resilient and each including a vertical flange and a horizontal flange, a channel at the lower portion of the vertical flange of one of said angle strips and in which the lower portion of the vertical flange of the other of said angle strips is secured in a position with the horizontal flanges of the angle strips extending outwardly in opposite directions from the vertical flanges, said horizontal flange of the resilient angle strip being secured to the lower portion of the closure while the horizontal flange of the other of said angle strips and both vertical flanges remain free, and a fixed moulding strip in the path of the united vertical flanges during closing movement of the closure to flex the united strips into a position with the free horizontal and vertical flanges straddling the moulding strip in sealing contact therewith.

4. The combination of claim 3 wherein the free horizontal flange includes a sealing strip.

References Cited in the file of this patent

UNITED STATES PATENTS

| 475,391 | Durya | May 24, 1892 |
| 860,032 | Kean | July 16, 1907 |
| 2,065,078 | Lane | Dec. 22, 1936 |